United States Patent [19]  [11]  4,179,847
Osterwalder  [45]  Dec. 25, 1979

[54] ROOT BALL CLAMP

[76] Inventor: Jean-Pierre F. Osterwalder, 812 Cottage St., Vienna, Va. 22180

[21] Appl. No.: 926,381

[22] Filed: Jul. 20, 1978

[51] Int. Cl.² ............... A01G 23/04; A01G 23/06
[52] U.S. Cl. ......................... 47/76; 37/2 R; 37/182; 47/73; 294/50.7; 294/50.8
[58] Field of Search ............... 47/73, 76, 78; 37/2 R, 37/182; 294/50.7, 50.8

[56] References Cited

U.S. PATENT DOCUMENTS

| | | | |
|---|---|---|---|
| 388,154 | 8/1888 | Stanley et al. | 47/76 |
| 621,405 | 3/1899 | Garrett | 47/76 |
| 1,139,735 | 5/1915 | Spuhr | 47/76 |
| 1,694,410 | 12/1928 | Daw | 37/182 |
| 2,707,846 | 5/1955 | Beseler | 47/76 |
| 2,988,393 | 6/1961 | Logan | 47/76 |
| 3,017,719 | 1/1962 | Sigler et al. | 47/76 XR |
| 3,161,989 | 12/1964 | Sigler et al. | 47/76 |

FOREIGN PATENT DOCUMENTS 2250468  6/1975  France .......................... 47/76

Primary Examiner—Edgar S. Burr
Assistant Examiner—Steven A. Bratlie
Attorney, Agent, or Firm—Frederick L. Bergert

[57] ABSTRACT

An improved protective clamp for the root ball portion of a tree is disclosed. The clamp includes a plurality of arcuate plate members, each of which is provided with an outwardly extending foot portion at the lower end thereof. Raised re-inforcing ribs on the sides of each plate and a tie bar at the upper end thereof are additional features which provide a greatly improved protection for the root ball during removal of the tree from the ground, or when the tree is being transported, stored, or other-wise handled prior to planting, compared with the traditional "ball-burlapping".

5 Claims, 12 Drawing Figures

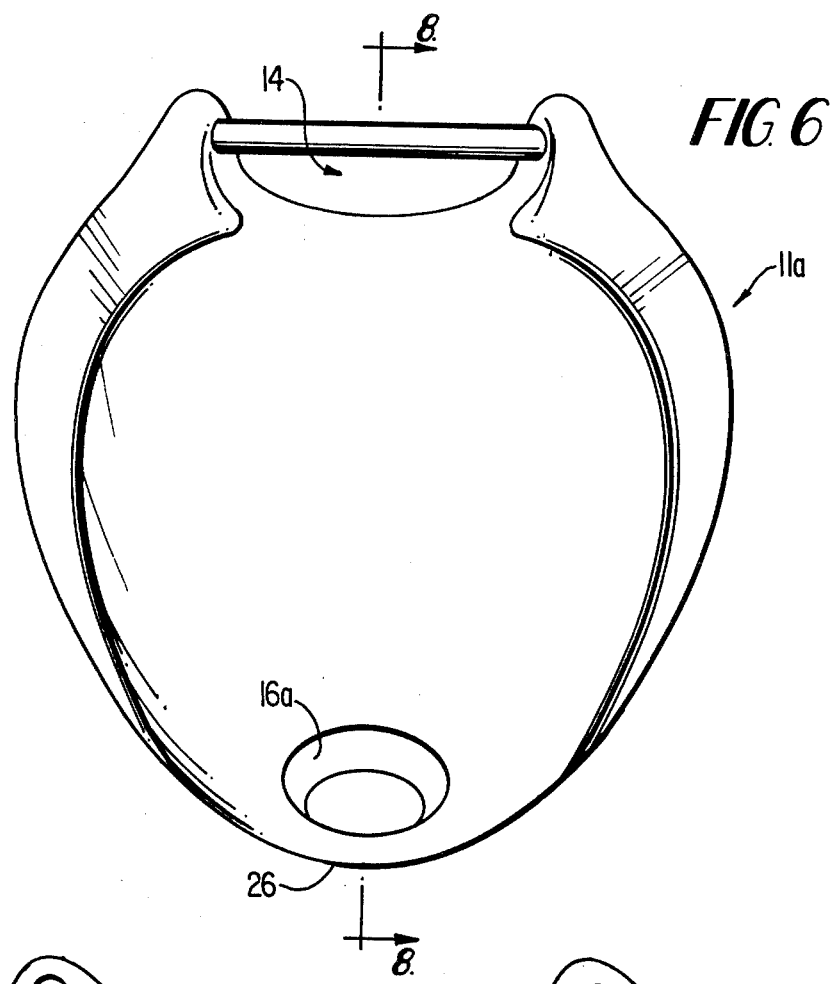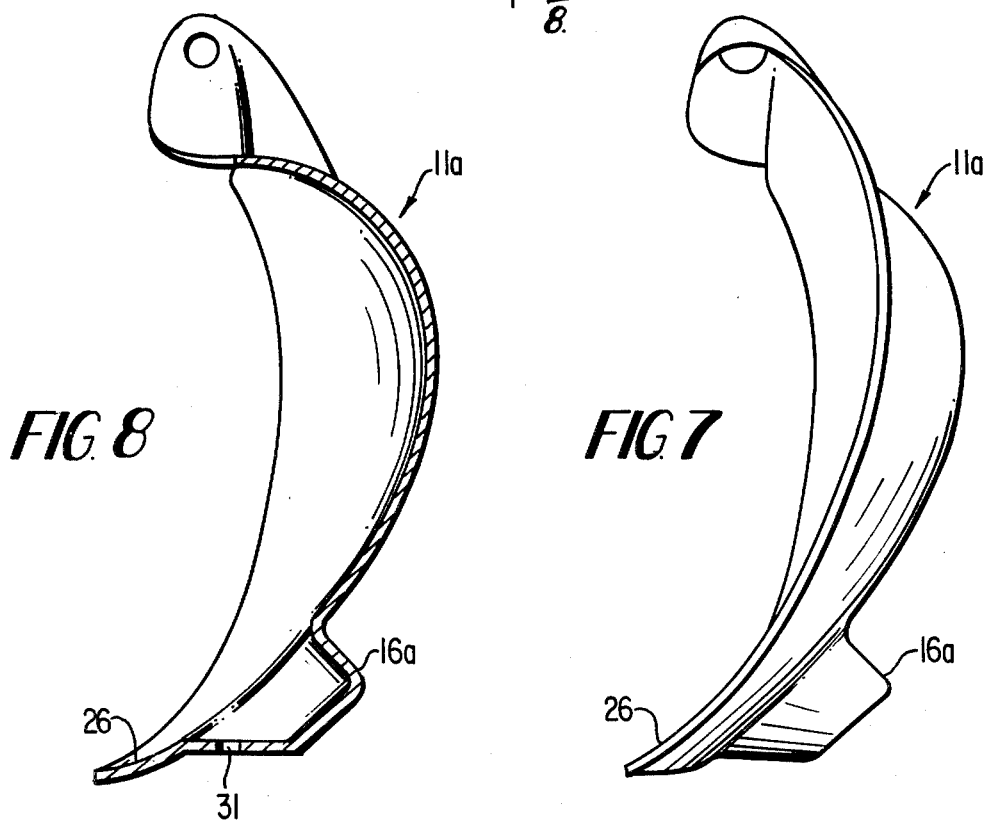

ROOT BALL CLAMP

BACKGROUND AND SUMMARY OF THE INVENTION

The present invention relates to a root ball clamp for containing and protecting the root ball portion of a tree. More particularly, the present invention relates to a protective clamp for encompassing and compressing the root ball of a tree to compress it and so to protect the same while the tree is being transported or otherwise handled or stored prior to re-planting.

Previous apparatus for use in protection of the root ball portion of a tree while transplanting or otherwise moving a tree has included such apparatus as described, for example, in U.S. Pat. No. 3,161,989 to Sigler et al. and 1,139,735 to Spuhr. The apparatus as described in U.S. Pat. No. 3,161,989 includes a plurality of segments which fit closely together at the bottom end thereof to approximately form a cone for receiving a tree. The apparatus of U.S. Pat. No. 1,139,735 includes a basket for the ball of the tree, the basket being formed by a plurality of plate members, each of which has a hook at its lower end and a loop at its upper end. The plates are connected by chains and the upper portions of the chains are engaged on the inside by rollers of a spacing bar. Other U.S. patents which disclose various types of apparatus for protecting the root ball portion of a tree include U.S. Pat. Nos. 388,154, 2,707,846 2,988,393 and 3,017,719.

By the present invention, there is provided an improved apparatus for protecting the root ball portion of a tree in a convenient and labor-saving manner for use during transplanting or otherwise moving or handling of the tree. The root ball clamp of the present invention includes a plurality of plate members, each of which is provided with a base or foot portion at the lower end thereof to provide stability for the tree in conjunction with the foot portion of one or more other plate members. The foot portion extends outwardly from the general plane of the plate member and provides a broad base for stability in conjunction with similarly shaped lower end portions of the other plate members. Each of the plate members is further provided with a re-inforcing rib on each longitudinal side thereof which extends outwardly and substantially perpendicular to the general plane of the plate member.

The plate members are formed in a generally inwardly curved configuration to provide a distortion resistant structure which is easily produced, readily molded, and stackable or nestable for storage purposes. The plate members are secured at the upper and lower ends thereof and around the circumference of the root ball of the tree, thus providing a stiff structure which is well suited to sustain great stresses that will occur when protecting the root bal portion of a tree from damage due to rough treatment, loss of soil around the root ball, and the like.

BRIEF DESCRIPTION OF THE DRAWINGS

The advantages and features of the root ball clamp of the present invention will be more fully understood from the following description of the preferred embodiments, taken in conjunction with the accompanying drawings, wherein:

FIG. 6 is a front elevation of an alternative embodiment of the root ball clamp of the present invention;

FIG. 7 is a side elevation of the embodiment of FIG. 6;

FIG. 8 is a cross-sectional view taken along line 8—8 of FIG. 6;

DESCRIPTION OF THE PREFERRED EMBODIMENTS

Figure 1:
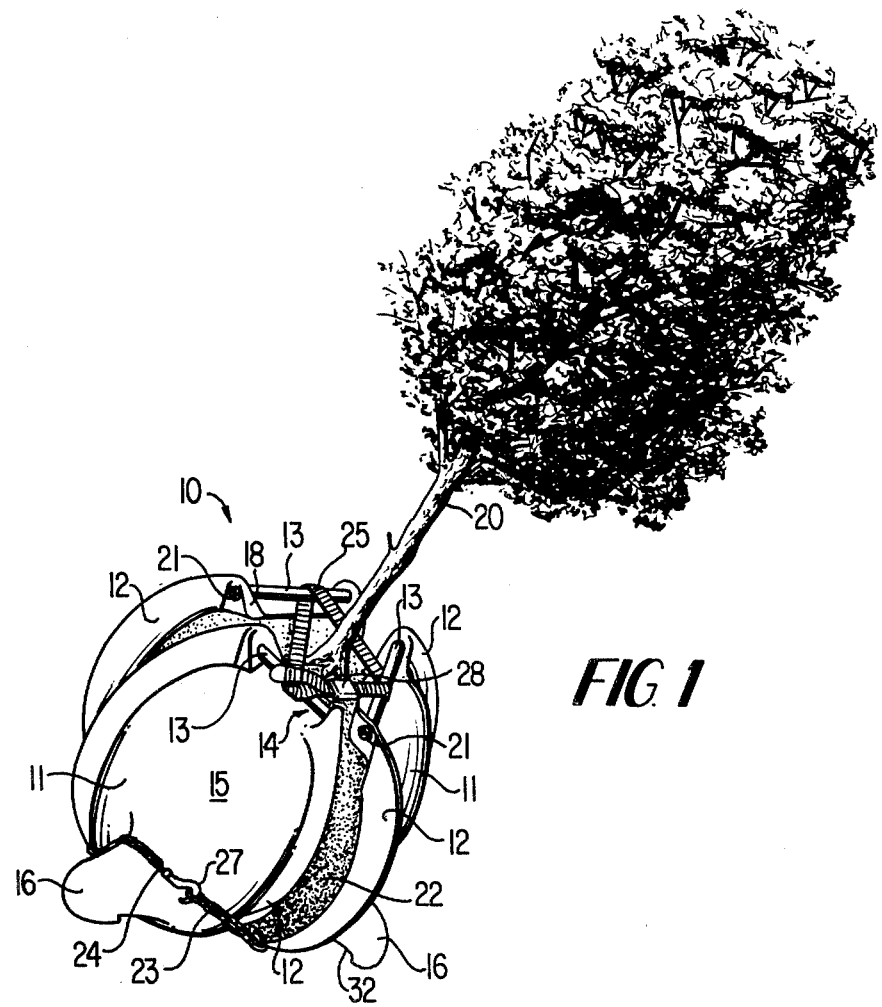
FIG. 1 is a perspective view, showing a tree with the root ball clamp of the present invention containing the root ball portion thereof.
Figure 2:
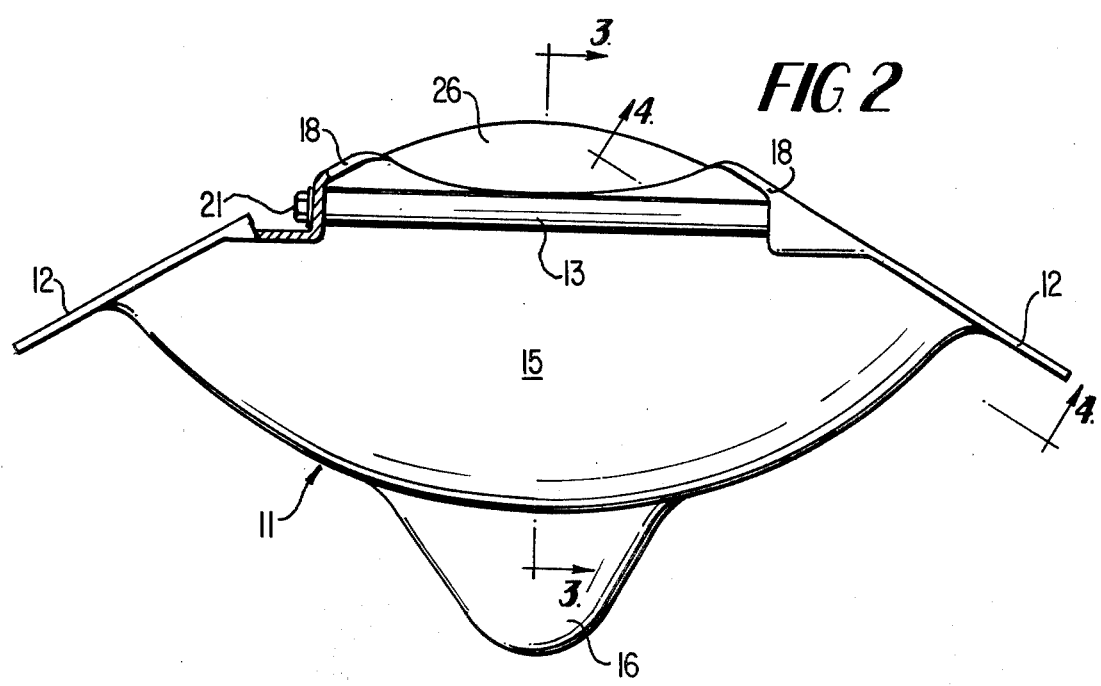
FIG. 2 is a plan view of one of the plate members of the root ball clamp of FIG. 1.

In the illustrated embodiment of the invention as shown in FIGS. 1 through 5, there is provided a root ball clamp 10 which includes a plurality of plate members 11. Each of the plate members 11 is constructed of a concave configuration, being curved inwardly from its top edge to its lower edge and also curved inwardly from its longitudinal sides, in order to provide a close fit in proximity to the root ball 22 of the tree 20 when the plate member is in use. The extreme lower end 26 of each plate member 11 is formed as a relatively thin edge shovel-like construction which is curved inwardly.

Each plate member 11 is provided with a rib 12 extending along either side of the plate member 11. The rib 12 on either side of each plate 11 is connected at its upper end with one end of a tie bar 13 which is spaced from and extends laterally across the upper end of the plate member 11, with a space 14 being provided between said tie bar 13 and the main portion 15 of each plate member 11. The tie bar 13 is attached at each end to the respective rib 12 by conventional means such as a nut 21 which is secured to a threaded end of the tie bar 13 which passes through a hole 19 in each rib 12. The hole 19 is located in an indented upper lug 18 of each rib 12.

Figure 3:
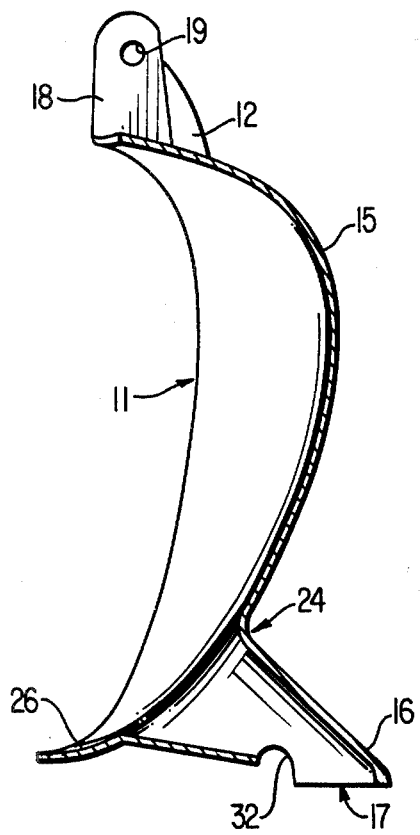
FIG. 3 is a cross-sectional view taken along line 3—3 of FIG. 2.
Figure 4:
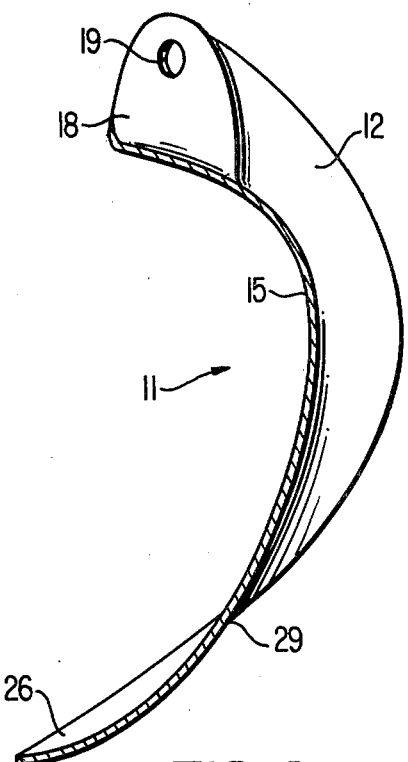
FIG. 4 is a cross-sectional view taken along line 4—4 of FIG. 2.
Figure 5:
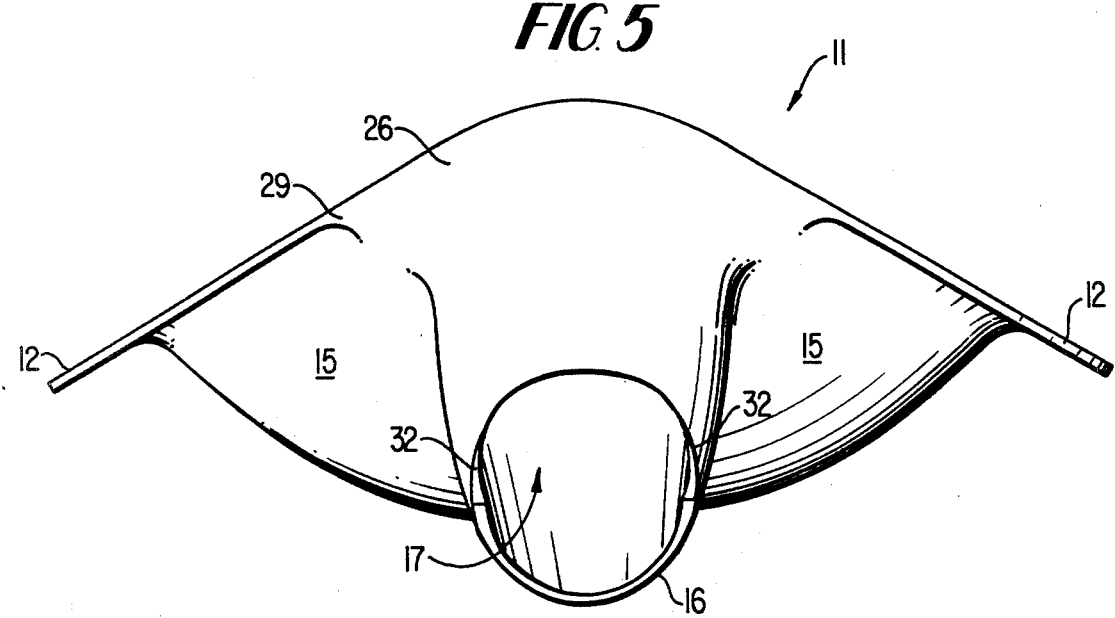
FIG. 5 is a bottom view of the plate member shown in FIG. 2.
Figure 9:
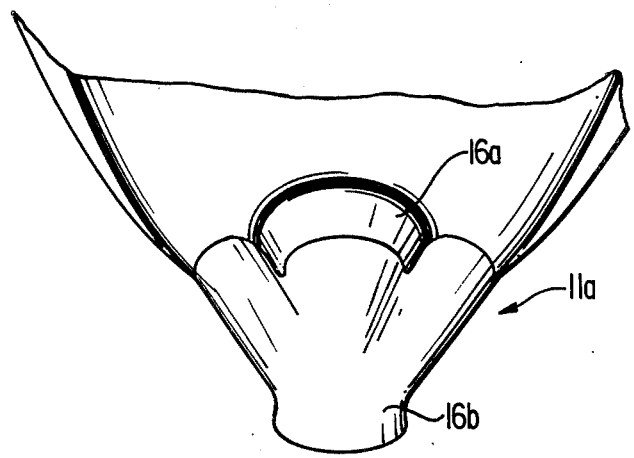
FIG. 9 is a partial elevation of the exterior of the embodiment of FIG. 10.
Figure 12:
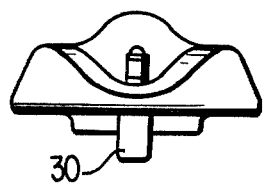
FIG. 12 is an elevation of the attachable foot portion of the embodiment of FIG. 10 looking outward from the truncated foot member.

As shown in detail in FIGS. 3 and 5, at the lower end of each plate member 11 there is provided a foot portion 16. This foot portion 16 is provided with walls which define a cavity 17 which extends through to the interior of the plate member 11. The cavity 17 is generally circular in cross-section throughout its length and the foot portion 16 which surrounds the opening at the lower end of the cavity 17 is of a generally half-circular cross-section, with the cavity 17 of the foot portion 16 increasing in size from the lower end toward the intersection of the foot portion 16 with the main portion 15 of the plate 11. The outer edge of the foot portion 16 is of increased thickness, as shown in FIGS. 3 and 5, for purposes of reinforcement and wear. The interior side surfaces 32 of the lower end of the foot portion 16 have an upwardly scooped or dished configuration, to assist in providing stability to the foot portion 16. The general angle of the foot portion 16 relative to the main portion 15 of the plate 11 is outwardly and downwardly, and may project downwardly at an angle such as, for example, about 45 degrees relative to the main portion 15, as shown in FIG. 3.

The ribs 12 on either side of each plate 11 provide reinforcement for the main portion 15 of the plate 11 and also prevent tearing or other damage to the edges of the plate 11. In addition, the ribs 12 provide an initial support for the root ball 22 of the tree 20 when the tree 20 is rolled over on its side during transfer out of a hole in the ground from which the tree is being removed or into which the tree is being transported for planting. The ribs 12 are tapered into the plane of the main portion 15 of the plate 11 at the lower end 29 thereof to provide a smooth surface for receiving the chain or other means which is employed to secure the lower ends of the plate members 11 in clamping engagement with the root ball 22 of the tree 20.

At the upper end, the tie bar 13 provides a point of attachment for a Nylon webbing, a belt or other means to secure the upper ends of the plates 11 in clamping engagement with the root ball 22. In addition, the tie bars 13 provide an access point for lifting the tree, by the use of a fork lift truck, for example and also provide a handle for easy manual positioning.

The plate members 11 may be constructed of any suitable durable material such as fiberglass, structural foam or sheet metal. The plate members 11 may be employed in various numbers, usually two or three, depending upon the size of the particular root ball 22.

In the use of the present invention with a tree which is being removed from the ground, a trench is dug around the circumference of the root ball as if the tree were being removed in a conventional manner. Upon establishing the root ball 22 of the tree 20 by such digging, one of the plate members 11 is positioned around one side of the root ball 22, and the foot of the operator is then placed on the upper surface of the foot portion 16 of the plate 11. The operator then presses down firmly with his foot, applying his full weight as necessary in order to work the lower end of the plate 11 under and around the root ball 22. The relatively thin edge shovel-like construction of the bottom 26 of the plate 11 lends itself to this action of working itself down into and around the root ball 22, under the weight of the operator.

The foregoing procedure is repeated with one or more additional plates 11 to cover the circumference of the root ball 22. A chain 23 is then extended around the lower portion of the plates 11, with the chain 23 passing at the position 24, upwardly of each foot portion 16 so as to pass immediately adjacent and contiguous with the intersection of each foot portion 16 with the respective main portion 15 of the plate 11. Securing means for the chain 23 may be any conventional means such as a chain hook 27 or chain-latch which is connected to one end of the chain 23 and which may be latched or inserted into any of the links at the opposite end of the chain, thus maintaining pressure to hold the lower ends 26 of the plates 11 firmly against the root ball 22. Thus the foot portions 16 assist in maintaining the chain 23 in a tight fit at position 24 and preclude slipping of the chain 23 from the lower end.

The upper ends of the plates 11 may be secured by means such as a length of rope, belt or Nylon webbing 25 which is passed around the tie bars 13 and tied securely together by any conventional means such as a Belt-tightener 28.

When the plates 11 have been secured together, the operator may commence to rock the tree 20 back and forth using the tie bars 13 as handles to finally push the tree over on its side to sever the tap root. The ribs 12 of the plates 11 provide arcuate surfaces which lend themselves to this action. Upon completion of this step, the tree may be lifted out of the ground, employing means such as a fork lift truck, with the blades of the fork lift being extended under the tie bars 13 which provide an ideal lifting point.

In a case where the tree is already out of the ground, the root ball clamp of the present invention may be installed around the circumference of the root ball 22 to provide compression and protection, in a manner similar to that previously described, but without the necessity for working the shovel portions 26 down into the ground to loosen the root ball 22. In either case, upon placing the tree with root ball clamp 10 installed in an upright position on a horizontal surface, resting on the feet portions 16, the clamp 10 will easily maintain the tree in such position without tipping, and with the root ball 22 being thus provided with excellent protection against injury.

In FIGS. 6 through 12, there is shown an alternative embodiment of the present invention, wherein the foot portion is provided as a truncated member 16a, and with an attachable foot portion 16b connected to the member 16a by means such as a swell latch lever 30 secured within a small opening 31 in the lower surface of the member 16a. The embodiment of FIGS. 6 through 12 is well suited for use either with or without the foot portion 16b being attached. When this embodiment is employed without the foot portion 16b, the plate member 11a is more easily manuevered in small, confined spaces, thus allowing the member 16a to be located within a smaller ditch or trench during tree removal, for example, without the necessity for excavation of a large ditch. Upon removal of the clamped tree from the ground, the foot portion 16b may be easily attached for additional stability when the tree is placed in an upright position.

Figure 10:
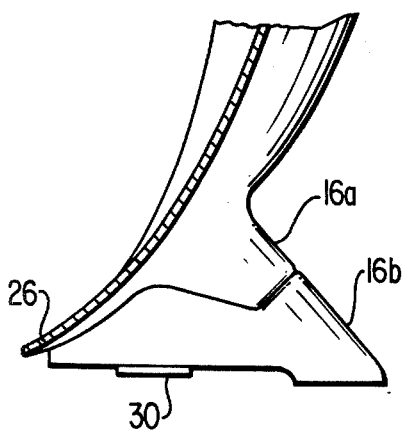
FIG. 10 is a partial side elevation of the embodiment of FIG. 6, showing an attachable foot portion connected thereto.
Figure 11:
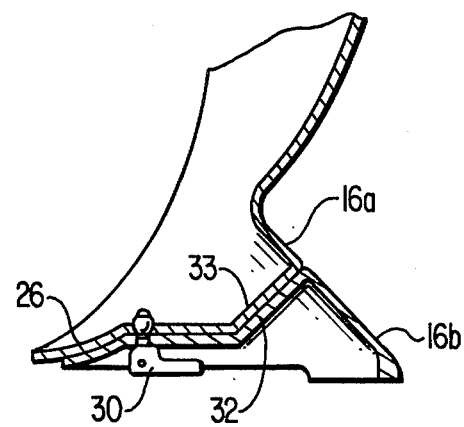
FIG. 11 is a side elevation in cross-section showing the embodiment of FIG. 10.

The other components of the plate member 11a, other than the foot portion configuration, are essentially the same as described in connection with the embodiment of FIGS. 1 through 5. As can be seen in FIGS. 10 and 11, the foot portion obtained by attachment of member 16b to the truncated base member 16a has the same general shape as the foot portion 16 previously described and would be employed in the same manner. Any other suitable connecting device, such as nut and bolt means, for example, may be employed to secure members 16a and 16b together. In FIGS. 10 and 11, the swell latch lever 30 employed is shown in its closed position, while FIG. 12, a view from the interior of the plate 11a, shows the lever 30 in the open or unlatched condition. The detachable member 16b is provided with a upper wall 32 which engages and conforms to the shape of a lower wall 33 of the base member 16a, thus providing strength and rigidity to the foot portion when the latch lever 30 or other securing means is secured in a closed or tightened position.

It is thought that the invention and many of its attendant advantages will be understood from the foregoing description, and it will be apparent that various changes may be made in the form, construction and arrangement of the parts without departing from the spirit and scope of the invention or sacrificing its material advantages, the forms hereinbefore described being merely preferred embodiments thereof.

It is claimed:

1. A root ball clamp system for protecting, surrounding and clamping the root ball portion of a tree, comprising:

a plurality of plate members, each of said plate members being curved inwardly from its top edge to its lower edge and also curved inwardly from its longitudinal sides, each plate member having a foot portion at the lower end thereof which extends outwardly and downwardly from the general plane of the plate member and which acts as a base in conjunction with similarly shaped foot portions of the other plate members, each plate member having a raised reinforcing rib extending outwardly on each longitudinal side of the plate member, each of said reinforcing ribs being substantially perpendicular to the general plane of the plate member and extending upwardly beyond the top edge of said plate member, a tie bar spaced from and extending laterally across the upper end of each plate member, said tie bar being attached at each end to one of said re-inforcing ribs which extend upwardly beyond the top edge of said plate member, means extending around the periphery of said plate members at the lower ends thereof for securing the lower ends of said plate members about the root ball portion of a tree, said securing means extending upwardly over the foot portion of each plate member, and means for connecting the tie bars of said plate members to secure the upper ends of said plate members about the root ball portion of the tree.

2. The root ball clamp of claim 1, wherein the bottom end of said plate has a thin edge shovel-like construction.

3. The root ball clamp of claim 1, wherein said foot portion is provided with walls defining a cavity which extends from the bottom end of said foot portion through to the interior of said plate.

4. A root ball clamp system for protecting, surrounding and clamping the root ball portion of a tree, comprising:

a plurality of plate members, each plate member having a foot member at the lower end thereof which extends outwardly and downwardly from the general plane of the plate member and which acts as a base in conjunction with similarly shaped foot members of the other plate members, each foot member including an end piece which is detachable from an upper base portion of said foot member, said end piece being a major portion of said foot member, and means for securing the upper and lower ends of said plate members about the root ball portion of the tree.

5. The root ball clamp of claim 4, wherein said foot member is provided with walls defining a cavity within said foot member, and wherein said detachable end piece has an upper wall which extends across said cavity to engage and conform with a lower wall of said upper base portion.

* * * * *